United States Patent
Suel, II

(10) Patent No.: US 10,277,153 B2
(45) Date of Patent: Apr. 30, 2019

(54) PHASE CONTROL OF AN INDUCTION MOTOR

(71) Applicant: General Electric Company, Schenectady, NY (US)

(72) Inventor: Richard Dean Suel, II, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 702 days.

(21) Appl. No.: 14/921,176

(22) Filed: Oct. 23, 2015

(65) Prior Publication Data

US 2017/0117838 A1  Apr. 27, 2017

(51) Int. Cl.
*H02P 27/00* (2006.01)
*H02P 23/07* (2016.01)
*H02P 6/182* (2016.01)

(52) U.S. Cl.
CPC .............. *H02P 23/07* (2016.02); *H02P 6/182* (2013.01); *H02P 2207/01* (2013.01)

(58) Field of Classification Search
CPC ............................... H02P 23/065; H02P 23/06
USPC ........................................................ 318/816
See application file for complete search history.

(56) References Cited

U.S. PATENT DOCUMENTS

| | | | | | |
|---|---|---|---|---|---|
| 4,369,403 A | * | 1/1983 | Lee | ........................ | H02P 23/26 318/729 |
| 4,459,529 A | * | 7/1984 | Johnson | .................. | H02P 23/26 318/729 |
| 4,704,570 A | * | 11/1987 | Hopkins | .................. | H02P 23/26 318/729 |
| 5,565,753 A | * | 10/1996 | Chen | ....................... | H02P 27/02 318/809 |
| 8,487,570 B2 | * | 7/2013 | Walter | .................... | H02P 25/14 318/400.14 |
| 2005/0184708 A1 | * | 8/2005 | Pippin | ....................... | G05F 1/70 323/235 |
| 2011/0254476 A1 | * | 10/2011 | Clothier | ................. | H02P 6/008 318/400.1 |
| 2011/0254489 A1 | * | 10/2011 | Greetham | ................ | H02P 6/14 318/400.14 |

* cited by examiner

*Primary Examiner* — Eduardo Colon Santana
*Assistant Examiner* — Gabriel Agared
(74) *Attorney, Agent, or Firm* — Dority & Manning, P.C.

(57) ABSTRACT

Systems and methods for controlling an induction motor are provided. In particular, data indicative of an alternating current voltage signal associated with an induction motor can be received. The alternating current voltage signal can be applied to the induction motor through a switching element coupled between a power source and the induction motor. A zero cross voltage signal can then be generated based at least in part on the data indicative of the alternating current voltage signal. A phase delay period for at least one half cycle period of the zero cross signal can then be determined. Operation of the induction motor can then be controlled by providing one or more control signals to the switching element causing the switching element to conduct current for one or more gating periods. Each gating period can be determined based at least in part on the phase delay period.

20 Claims, 4 Drawing Sheets

PHASE CONTROL OF AN INDUCTION MOTOR

FIELD OF THE INVENTION

The present subject matter relates generally to induction motors, and more particularly to controlling an amount of power delivered to an induction motor.

BACKGROUND OF THE INVENTION

Induction motors are widely used in home appliances and other electromechanical systems. Induction motors typically produce torque to drive a load by applying a current to one or more stator windings to create a magnetic field. The magnetic field of the stator windings induces a current in a rotor, which in turn creates magnetic fields in the rotor that react against the magnetic field of the stator windings, and causes the rotor to rotate.

In conventional single speed induction motors, such as permanent split capacitor (PSC) motors, the motor is driven by turning on an alternating current switching element, such as a Triac, to allow current to be applied to the motor. Variable speed operation is often desirable and may be achieved by skipping AC cycles or phase controlling the Triac. Phase controlling generally produces better performance in terms of speed regulation and audible noise. However, the inductive properties of the induction motor cause the motor current to lag the voltage, which can cause inefficient operation of the induction motor at low phase delays (higher power). In particular, as the Triac is a current controlled device, such lagging current can cause failed Triac gating at low phase delays, which can lead to significantly reduced performance of the motor.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling an induction motor. The method includes receiving data indicative of an alternating current voltage signal associated with an induction motor. The alternating current voltage signal being applied to the induction motor through a switching element coupled in series between a power source and the induction motor. The method further includes generating a zero cross voltage signal based at least in part on the data indicative of the alternating current voltage signal. The zero cross voltage signal comprises a plurality of half cycle periods. The method further includes determining a phase delay period for at least one half cycle period of the zero cross signal based at least in part on an inductance associated with the induction motor and a desired operating speed of the induction motor. The method further includes controlling operation of the induction motor by providing one or more control signals to the switching element causing the switching element to conduct current for one or more gating periods. Each gating period corresponds to at least a portion of a half cycle period of the zero cross voltage signal. Each gating period being determined based at least in part on the phase delay period corresponding to the half cycle period.

Another example aspect of the present disclosure is directed to an induction motor including a rotor, a stator, a voltage sensing device configured to measure an alternating current voltage signal applied to the induction motor, and a switching element coupled between a power source and the induction motor. The induction motor further includes one or more control devices configured to selectively control an operating speed of the induction motor by receiving data indicative of the alternating current voltage signal and generating a zero cross voltage signal based at least in part on the data indicative of the alternating current voltage signal. The zero cross voltage signal includes a plurality of half cycle periods. The one or more control devices are further configured to control the operating speed of the induction motor by determining a phase delay period for at least one half cycle period of the zero cross signal based at least in part on an inductance associated with the induction motor and a desired operating speed of the induction motor, and controlling operation of the induction motor by providing one or more control signals to the switching element to cause the switching element to conduct current for one or more gating periods. Each gating period corresponds to at least a portion of a half cycle period of the zero cross voltage signal. Each gating period is determined based at least in part on the phase delay period corresponding to the half cycle period.

Yet another example aspect of the present disclosure is directed to a control system including one or more memory devices and one or more processors, the processors storing computer-readable instructions that when executed by the one or more processors cause the one or more processors to perform operations. The operations include receiving data indicative of an alternating current voltage signal associated with an induction motor. The alternating current voltage signal is applied to the induction motor through a switching element coupled in series between a power source and the induction motor. The operations further include generating a zero cross voltage signal based at least in part on the data indicative of the alternating current voltage signal. The zero cross voltage signal includes a plurality of half cycle periods. The operations further include determining a phase delay period for at least one half cycle period of the zero cross signal based at least in part on an inductance associated with the induction motor and a desired operating speed of the induction motor. The operations further include controlling operation of the induction motor by providing one or more control signals to the switching element to cause the switching element to conduct current for one or more gating periods. Each gating periods corresponds to at least a portion of a half cycle period of the zero cross voltage signal. Each gating period is determined based at least in part on the phase delay period corresponding to the half cycle period.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
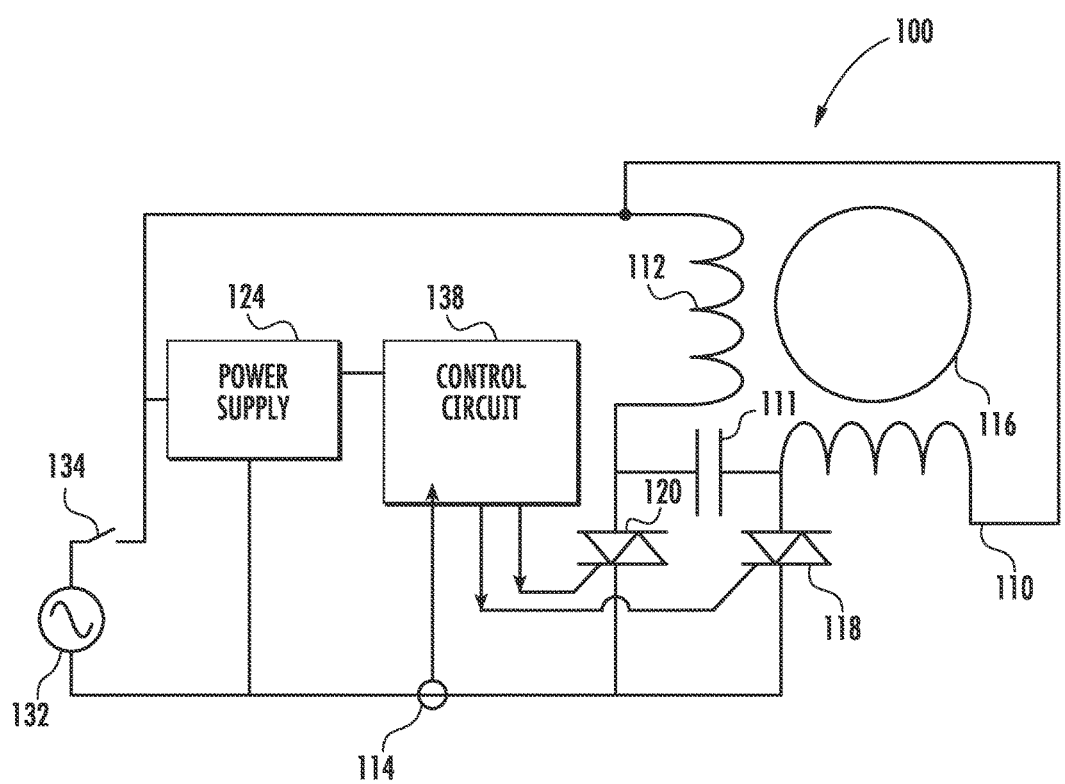
FIG. 1 depicts a schematic of an example PSC induction motor control system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to phase controlling a load, such as an induction motor. In particular, a zero cross voltage signal can be generated from an alternating current (AC) voltage signal applied to the load. The zero cross signal can include a plurality of half cycle periods. The zero cross signal can be used to drive a switching element coupled in series between a power supply and the load. In this manner, the switching element can be configured to conduct current to the load for one or more gating periods during each half cycle period of the zero cross signal. A gating period can be determined based at least on a phase delay associated with the half cycle period and a margin period associated with the half cycle period.

More particularly, an AC voltage signal applied to a load can be measured, monitored, or otherwise sensed. The voltage signal can be used to generate a zero cross voltage signal having a maximum voltage level and a minimum voltage level. The zero cross signal can be generated by detecting each point in time wherein the AC voltage signal reaches a magnitude of zero volts. Upon such occurrence, the zero cross signal can transition between voltage levels. In this manner, the zero cross signal can be a square wave that approximately tracks the AC voltage signal.

As indicated above, the AC voltage signal can be applied to a load, such as an induction motor. In example embodiments, one or more switching elements can be coupled between a power supply and the induction motor. The one or more switching elements may include one or more Triacs, silicon-controlled rectifiers (SCRs), relays, contactors, insulated-gate bipolar transistors (IGBTs), and/or various other suitable switching elements. The switching elements can be selectively controlled to conduct current to the induction motor during one or more gating periods. In particular, the switching elements can be controlled based at least in part on the generated zero cross signal. For instance, in embodiments wherein a Triac is used, at least a portion of the zero cross signal can be applied to the gate of the Triac, such that the Triac conducts a load current between the two main terminals of the Triac during one or more gating periods.

Each gating period can correspond to at least a portion of a half cycle period of the zero cross signal. In this manner, a phase delay period can be determined for each half cycle period while the induction motor is in operation. A phase delay period can correspond to a period of time immediately following the beginning of a half cycle period of the zero cross signal during which current is not conducted between the main terminals of the Triac. In this manner, the gating period corresponding to a half cycle period of the zero cross signal can correspond to a period of time immediately following the phase delay period until the end of the half cycle period. As will be described in more detail below, in some embodiments, the gating period can correspond to the period of time during the half cycle period between the phase delay period and a margin period. For instance, in a particular implementation, the phase delay period can be determined based at least in part on the inductance of the induction motor. In particular, the inductive properties of the motor can cause the current flowing through the motor to lag the corresponding voltage. In this manner, the phase delay period can be determined at least in part from the amount of current lag caused by the induction motor.

In further embodiments, the phase delay period can be determined based at least in part on a desired operational speed of the induction motor. In particular, the phase delay period can determine the average power applied to the induction motor, which can determine the operational speed of the motor. As an example, an induction motor can be implemented in a washing machine appliance having one or more associated operational cycles and/or speed settings. The phase delay period can be determined based on a selected operational cycle and/or speed setting. In example embodiments, the phase delay period can be incrementally increased or decreased in order to increase or decrease the speed of the motor at a desired rate. In particular, during each half cycle period of the zero cross signal, the phase delay period can be adjusted incrementally based on the desired speed and/or the desired rate of change of the speed.

In still further embodiments, the phase delay period can further be determined based at least in part on a measured speed of the induction motor. For instance the speed of the induction motor can be measured using one or more sensor devices (or other suitable speed sensing techniques) associated with the induction motor. The measured speed can then be compared against the desired speed. The phase delay period can then be adjusted based at least in part on the comparison to meet the desired speed.

As indicated above, in alternative embodiments, the gating period can further be determined based at least in part on a margin period associated with each half cycle of the zero cross signal. The margin period can correspond to a period of time immediately prior to the end of a half cycle period wherein the Triac gate is to be turned off. For instance, the margin period can be implemented for each half cycle period to prevent or reduce potential phasing into the subsequent half cycle period. In example embodiments, the margin period can be between about 5% and about 30% of the corresponding half cycle period. As used herein, the term "about," when used in conjunction with a numerical value, is intended to refer to within 30% of the numerical value. In this manner, the gating period corresponding to a half cycle period of the zero cross signal can correspond to the period of time between the end time of the phase delay period and the start time of the margin period.

With reference now to the figures, example embodiments of the present disclosure will be discussed in further detail. For instance, FIG. 1 depicts a schematic of an example induction motor control system 100. More particularly, FIG. 1 illustrates a circuit diagram of one embodiment of PSC motor and associated circuitry as may be used to implement the present subject matter. As part of a stator, a start winding 110 is coupled in parallel with a run winding 112 for providing torque to a rotor 116. In the presently illustrated embodiment both windings are further coupled to a power supply 124 through a control circuit 138. Power supply 124 is configured to receive an input voltage from AC source 132, such as 110 volts, through a switch 134, and to supply a DC voltage to control circuit 138 to provide operating power for control circuit 138.

Start winding 110 and run winding 112 are coupled to control circuit 138 through switches shown as clockwise Triac 118 and counter-clockwise Triac 120. Triacs 118 and 120 may be switched off when the load current is close to zero. In this manner, Triacs 118 and 120 may be used to respectively connect and disconnect start winding 110 and run winding 112 to and from power source 132. It will be appreciated that the illustration of Triacs 118 and 120 is for example only. Various other switches, such as but not limited to, field effect transistors, and/or back to back SCR configurations can alternatively be used, if desired. In example embodiments, start winding 110 may be coupled to a capacitor 111 to provide the phase shift necessary for starting the motor.

A voltage sensor 114 is coupled to the start and run windings 110, 112 by way of being placed in the common power line connecting the windings to power source 132. In one embodiment, the voltage sensor may correspond to a resistor of appropriate size, such as 0.1 ohm, coupled to control circuit 138, for example, in a configuration which measures the voltage drop across the resistor. In some embodiments, voltage sensor 114 is coupled to a portion of the control circuit containing an analog-to-digital (A/D) converter 122, to convert the voltage across the resistor to a digital voltage signal. Alternatively, voltage sensor 114 may correspond to various other suitable voltage sensing devices. As will be described in greater detail below, voltage sensor 114 can be configured to monitor an alternating current voltage applied to the stator winding(s) and to provide a signal indicative of the monitored voltage to control circuit 138 for use in current signature analysis.

In example embodiments, a zero cross voltage signal can be derived from the measured AC voltage signal. As indicated above, the zero cross signal can be a square wave having a maximum voltage level and a minimum voltage level. The zero cross signal can transition between voltage levels each time the AC voltage signal reaches a magnitude of zero volts. At least a portion of the zero cross signal can be provided to the gates of Triacs 118 and 120 by control circuit 138 to control the timing of the load current flowing between the main terminals of Triacs 118 and 120 to the stator windings. In particular, the maximum and minimum voltage levels of the zero cross signal can be a magnitude sufficient to trigger Triacs 118, 120, such that, when the at least a portion of the zero cross signal is provided to the Triac gates, current will flow between the main terminals of Triacs 118, 120 to the stator windings. The at least a portion of the zero cross signal provided to the Triac gates can correspond to a current gating period determined based at least in part on a desired speed of the induction motor. For instance, the gating period can correspond to a period of time during a half cycle of the zero cross signal between a determined phase delay period and a margin period.

It will be appreciated that the induction motor system 100 depicted in FIG. 1 is for illustrative purposes only. It will further be appreciated that various other suitable induction motor control systems can be used without deviating from the scope of the present disclosure. For instance, such suitable induction motor systems may include wound type induction motors, squirrel-cage induction motors, three phase induction motors, or various other suitable induction motors having various suitable configurations and/or control circuitries. In alternative embodiments, example embodiments of the present disclosure can be used to phase control various other inductive loads, such as, but not limited to, induction coils.

Figure 2:
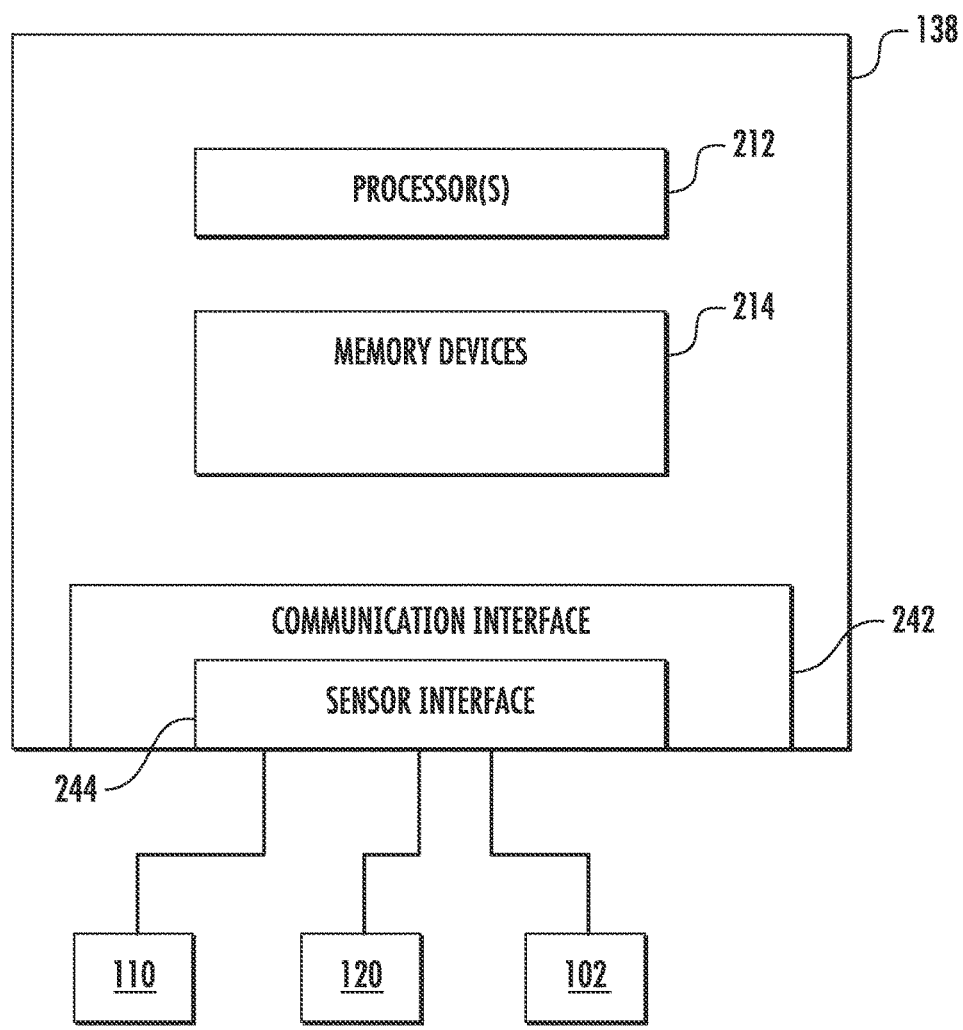
FIG. 2 depicts a block diagram of one embodiment of suitable components that may be included within a control circuit according to example embodiments of the present disclosure.

FIG. 2 depicts a block diagram of one embodiment of suitable components that may be included within control circuit 138 and/or various other suitable control devices in accordance with example aspects of the present disclosure. As shown, the control circuit 138 may include one or more processor(s) 212 and associated memory device(s) 214 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 214 may generally be configured to store suitable computer-readable instructions that, when implemented by the processor(s) 212, configure control circuit 138 to perform various functions including, but not limited to, receiving directly or indirectly signals from one or more sensors (e.g. voltage sensors, current sensors, and/or other sensors) indicative of various input conditions, determining a capacitor bank voltage, controlling a pre-charge process of the capacitor bank, and/or various other suitable computer-implemented functions. An interface can include one or more circuits, terminals, pins, contacts, conductors, or other components for sending and receiving control signals. Moreover, control circuit 138 may include a sensor interface 244 (e.g., one or more analog-to-digital converters) to permit signals transmitted from the sensors (e.g. sensors 102, 110, and 120) to be converted into signals that can be understood and processed by the processors 212.

Figure 3:
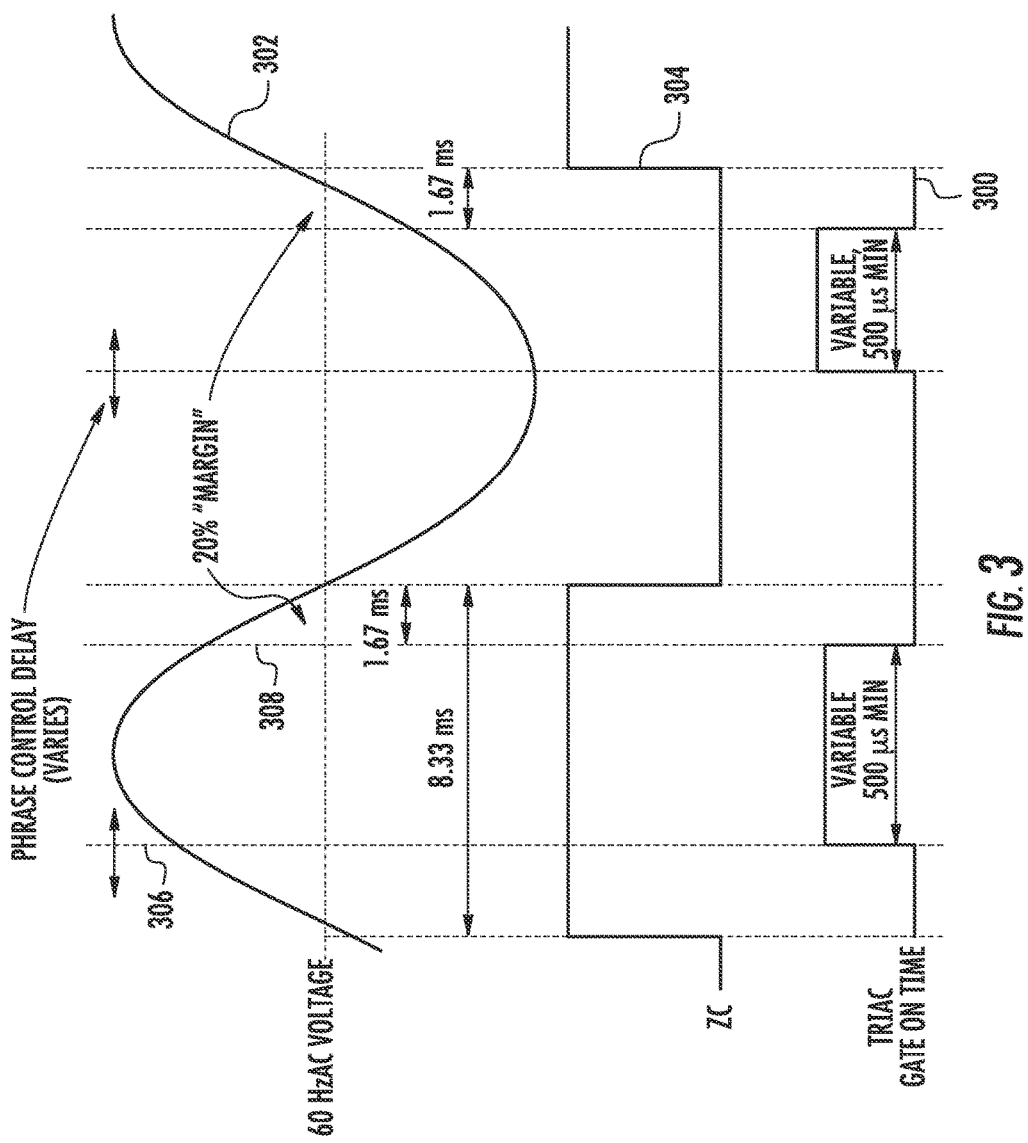
FIG. 3 depicts a plot of an example timing scheme for one or more switching elements according to example embodiments of the present disclosure.

FIG. 3 depicts a plot of an example gate control timing scheme 300 associated with a Triac gate according to example embodiments of the present disclosure. In particular, FIG. 3 depicts a measured AC voltage signal 302 provided by a power supply to an induction motor. Although AC voltage signal 302 depicts a 60 Hertz (Hz) signal, it will be appreciated that various other suitable frequencies can be used without deviating from the scope of the present disclosure. FIG. 3 further depicts a zero cross signal 304 derived from the AC voltage signal 302. The zero cross signal 304 can be configured to be a square wave that approximately tracks the AC voltage signal 302. As shown, the zero cross signal can be configured to transition between a maximum voltage level and a minimum voltage level each time the AC signal 302 crosses zero volts. As will be understood by those skilled in the art, the zero cross signal 304 (and the AC signal 302) can include a plurality of half cycle periods that correspond to half the amount of time taken for the AC signal 302 to complete one cycle. As shown, when a 60 Hz AC signal is used, a half cycle period can be about 8.33 milliseconds.

Gate control timing 300 can correspond to at least a portion of the zero cross signal. For instance, gate control timing 300 can be determined based at least in part on a variable phase delay period 306. Phase delay period 306 can correspond to a period of time at the initiation of a half cycle period during which current is not to be delivered to the stator windings of the induction motor. Phase delay period can be determined based at least in part on a desired amount of power to be delivered to the stator windings, and thereby, based at least in part on a desired operational speed of the induction motor.

In example embodiments, phase delay period 306 can further be determined based at least in part on a measured speed of the induction motor. For instance, the operational speed of the induction motor can be measured using one or more sensor devices and/or various other suitable speed sensing techniques. The measured speed can be compared against a desired speed, and the phase delay period 306 can be controlled based at least in part on the comparison.

In example embodiments, gate control timing 300 can further be determined based at least in part on a margin period 308. As shown, margin period 308 can be a period of time immediately prior to the end of a half cycle period of the zero cross signal 304. The margin period can be determined to eliminate or reduce phasing into the subsequent half cycle period. For instance, the margin period depicted in FIG. 3 corresponds to 20% of the half cycle period, or about 1.67 milliseconds. It will be appreciated that various other suitable margin periods can be used without deviating from the scope of the present disclosure.

In embodiments wherein a margin period is used, the gating period can correspond to the period of time between the phase delay period 306 and the margin period 308. In this manner, gate control timing 300 can be configured such that the portion of the zero cross signal 306 that corresponds to the gating period is provided to the Triac gate(s). As will be appreciated by those skilled in the art, the Triac will continue to conduct current between its main terminals until the current falls to zero amps. In this manner, the amount of voltage applied to the stator windings during each half cycle period of the zero cross signal can correspond to the gating period plus the margin period. For instance, the Triacs (e.g. Triacs 118, 120 of FIG. 1) can be configured to conduct current between the main terminals of the Triacs only during the period of time when zero cross signal 306 is applied to the Triac gates (e.g. the gating period) and the margin period.

In alternative embodiments, when the period of time during a half cycle period between the phase delay period and the margin period is less than a minimum gating period, the gating period can correspond to the minimum gating period. In this manner, the period of time during each half cycle period in which the Triac gate voltage is applied never falls below the minimum gating period. As depicted in FIG. 3, the minimum gating period can be 500 microseconds, although other suitable minimum gating periods can be used. In example embodiments, the minimum gating period can correspond to a period of time required to turn the Triac on, such that current can flow between the Triac main terminals.

Figure 4:
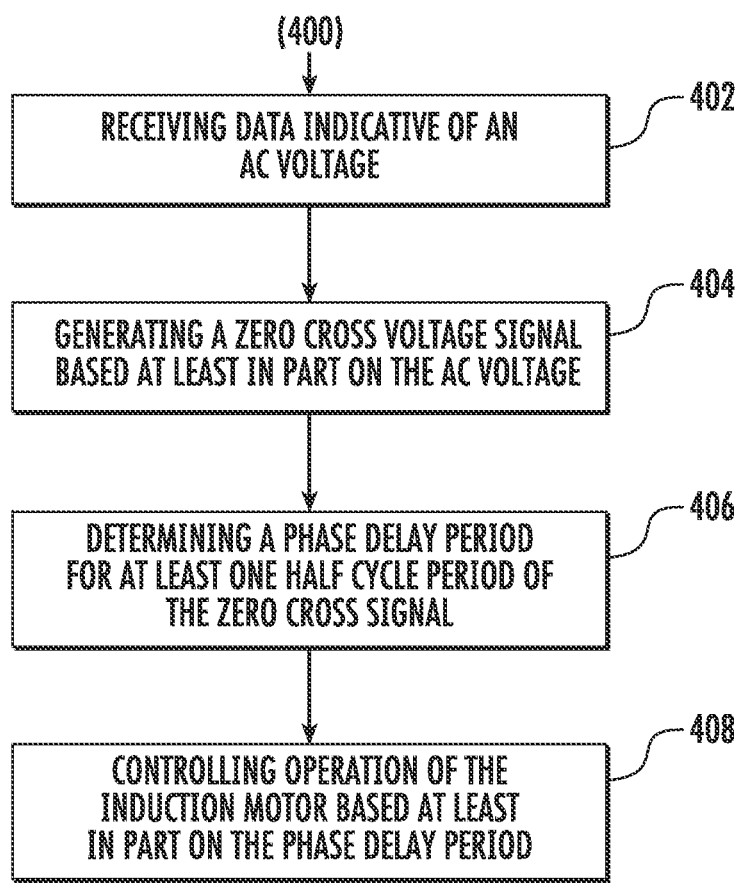
FIG. 4 depicts a flow diagram of an example method of controlling operation of an induction motor according to example embodiments of the present disclosure.

FIG. 4 depicts a flow diagram of an example method (400) of controlling an induction motor according to example embodiments of the present disclosure. Method (400) can be implemented by one or more computing devices, such as one or more of the computing devices depicted in FIG. 1. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include receiving data indicative of an AC voltage signal. The AC voltage signal can be supplied from a power supply to an induction motor. In particular, the AC voltage signal can be applied to one or more stator windings of the induction motor. The AC signal can be monitored, measured, or otherwise sensed using one or more voltage sensing techniques.

At (404), method (400) can include generating a zero cross voltage signal based at least in part on the AC voltage signal. In particular, as indicated above, the zero cross signal can be a square wave that transitions between a maximum voltage level and a minimum voltage level when the AC signal crosses zero volts. For instance, in some implementations, the zero cross signal can be implemented by feeding the AC voltage signal into a zero cross circuit. The zero cross circuit can output a square wave, which can be used to drive the Triac(s) according to example aspects of the present disclosure. In other implementations, the zero cross signal can be generated using one or more software based techniques.

At (406), method (400) can include determining a phase delay period for at least one half cycle period of the zero cross signal. A half cycle period can correspond to the amount of time required for the AC signal to travel from zero volts to zero volts. The phase delay period can correspond to a period of time starting at the beginning of a half cycle period during which current is not applied to the induction motor. The phase delay period can be determined based at least in part on a desired speed of the induction motor. In particular, the phase delay period(s) can be determined such that the amount of power applied to the induction motor corresponds to the desired speed. For instance, if the desired speed of the induction motor is full speed, the phase delay period can be 0.0 seconds.

At (408), method (400) can include controlling operation of the induction motor based at least in part on the determined phase delay period. In particular, at least a portion of the zero cross signal can be provided to a gate of one or more switching elements configured to selectively conduct the AC current to the induction motor. The at least a portion of the zero cross signal can correspond to a gating period. The gating period can correspond to the period of time during a half cycle period of the zero cross signal between the phase delay period and the end of the half cycle period. In this manner, the zero cross signal can be provided to the gate of the switching element(s) only during the gating period.

In alternative embodiments, the gating period can correspond to a period of time between the phase delay period and a margin period. The margin period can be a period of time immediately prior to the end of the half cycle period. In example embodiments the margin period may correspond to about 20% of the half cycle period.

In example embodiments, the gating period can be incrementally adjusted over a plurality of half cycle periods of the zero cross signal. In this manner, the operational speed of the induction motor can be gradually increased or decreased to meet a desired speed. In this manner, the rate of speed adjustment can be controlled based at least in part on one or more operational cycles and/or speed settings associated with the induction motor.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling an induction motor, the method comprising:
   receiving data indicative of an alternating current voltage signal associated with the motor, the alternating current voltage signal being applied to the motor through a switching element coupled in series between a power source and the motor;
   determining a phase delay period for a half cycle period of a zero cross voltage signal determined based, at least in part, on the data indicative of the alternating current voltage signal, the phase delay period based at least in part on a desired operating speed of the motor, the phase delay period corresponding to a period of time occurring after a start of the half cycle period; and
   controlling operation of the motor by providing one or more control signals to the switching element causing the switching element to conduct current for a gating period corresponding to a period of time occurring between an end of the phase delay period and an end of the half cycle period.

2. The method of claim 1, wherein the phase delay period is further determined based at least in part on a measured speed of the motor.

3. The method of claim 1, wherein the switching element is a Triac device, and wherein the one or more control commands are provided to a gate of the Triac device.

4. The method of claim 1, wherein the zero cross signal comprises a square wave having a first voltage level and a second voltage level.

5. The method of claim 4, wherein the zero cross signal comprises at least one voltage level transition wherein the zero cross signal transitions between the first voltage level and the second voltage level, each voltage level transition occurring when the magnitude of the alternating current voltage signal is zero volts.

6. The method of claim 1, wherein current is not delivered to stator windings of the motor during the phase delay period.

7. The method of claim 1, further comprising determining a margin period for the half cycle period, the margin period corresponding to a period of time occurring between an end of the phase delay period and an end of the half cycle period.

8. The method of claim 7, wherein the gating period corresponds to a period of time occurring between the end of the phase delay period and a start of the margin period.

9. The method of claim 8, wherein the duration of the margin period is between about 5% and about 30% of the duration of the half cycle period.

10. The method of claim 8, wherein when the period of time between the phase delay period and the margin period is less than a minimum gating period, the gating period corresponds to the minimum gating period.

11. A motor comprising:
    a rotor;
    a stator;
    a voltage sensing device configured to measure an alternating current voltage signal applied to the motor;
    a switching element coupled between a power source and the motor; and
    one or more control devices configured to selectively control an operating speed of the motor by:
       receiving data indicative of the alternating current voltage signal;
       generating a zero cross voltage signal based at least in part on the data indicative of the alternating current voltage signal;
       determining a phase delay period for a half cycle period of the zero cross signal, the phase delay period based, at least in part, on a desired operating speed of the motor, the phase delay period corresponding to a period of time occurring after a start of the half cycle period; and
       controlling operation of the motor by providing one or more control signals to the switching element to cause the switching element to conduct current for a gating period corresponding to a period of time occurring between an end of the phase delay period and an end of the half cycle period.

12. The motor of claim 11, wherein the phase delay period is further determined based at least in part on a comparison between a measured speed of the motor to the desired speed of the motor.

13. The motor of claim 11, wherein the switching element is a Triac device, and wherein the one or more control commands are provided to a gate of the Triac device.

14. The motor of claim 11, wherein the zero cross signal comprises a square wave having a first voltage level and a second voltage level.

15. The motor of claim 14, wherein the zero cross signal comprises at least one voltage level transition wherein the zero cross signal transitions between voltage levels, each voltage level transition occurring when the magnitude of the alternating current voltage signal is zero volts.

16. The motor of claim 11, wherein the one or more control devices are further configured to selectively control an operating speed of the motor by:
    determining a margin period for the half cycle period, the margin period corresponding to a period of time occurring between an end of the phase delay period and an end of the half cycle period.

17. The motor of claim 16, wherein the gating period corresponds to a period of time occurring between the end of the phase delay period and a start of the margin period.

18. A control system comprising:
    one or more memory devices; and
    one or more processors, the processors storing computer-readable instructions that when executed by the one or more processors cause the one or more processors to perform operations, the operations comprising:
       receiving data indicative of an alternating current voltage signal associated with an induction motor, the alternating current voltage signal being applied to the induction motor through a switching element coupled in series between a power source and the induction motor;

determining a phase delay period for a half cycle period of a zero cross voltage signal determined based, at least in part, on the data indicative of the alternating current voltage signal, the phase delay period based at least in part on a desired operating speed of the induction motor, the phase delay period corresponding to a period of time occurring after a start of the half cycle period; and controlling operation of the induction motor by providing one or more control signals to the switching element causing the switching element to conduct current for a gating period corresponding to a period of time occurring between an end of the phase delay period and an end of the half cycle period.

19. The control system of claim 18, wherein the switching element is a Triac device, and wherein the one or more control commands are provided to a gate of the Triac device.

20. The control system of claim 18, wherein the operations further comprise:

determining a margin period for the half cycle period, the margin period corresponding to a period of time occurring between an end of the phase delay period and an end of the half cycle period.

\* \* \* \* \*